United States Patent [19]

Fraser et al.

[11] Patent Number: 4,951,390

[45] Date of Patent: Aug. 28, 1990

[54] TURBINE BLADE REPAIR

[75] Inventors: Michael J. Fraser, Broughton Hackett; Raymond D. Legross, Henwick Park, both of United Kingdom

[73] Assignee: Refurbished Turbine Components Limited, Worcester, United Kingdom

[21] Appl. No.: 407,818

[22] Filed: Sep. 15, 1989

[30] Foreign Application Priority Data

Sep. 16, 1988 [GB] United Kingdom ................ 8821766
Nov. 7, 1988 [GB] United Kingdom ................ 8826019

[51] Int. Cl.$^5$ ............................................. B21K 3/04
[52] U.S. Cl. ................................ 29/889.1; 29/402.21; 29/889.7
[58] Field of Search .................... 29/156.8 B, 156.8 P, 29/156.8 R, 156.8 H, 402.05, 402.21, 559; 416/224

[56] References Cited

U.S. PATENT DOCUMENTS 4,050,133  9/1977  Cretella et al. .................. 29/402.21
4,726,101  2/1988  Draghi et al. .................... 29/402.21
4,866,828  9/1989  Fraser ............................. 29/156.8 B

FOREIGN PATENT DOCUMENTS 550671  5/1932  Fed. Rep. of Germany .

Primary Examiner—Howard N. Goldberg
Assistant Examiner—Irene Cuda
Attorney, Agent, or Firm—Parmelee, Miller, Welsh & Kratz

[57] ABSTRACT

A method of and apparatus for repairing turbine blades wherein the repair requires the input of considerable thermal energy during a welding or brazing operation for example. The method involves the step of pre-distorting the blade prior to the welding or brazing operation so that the distortion that is expected to occur during welding or brazing leaves the blade after repair in its proper position. A clamp means may be provided to prevent parts of an individual blade from being pre-distorted so as to localize the predistortion in the required area. A tool for predistorting the blade ensures that a physical force may be applied to a local area of the blade.

7 Claims, 4 Drawing Sheets

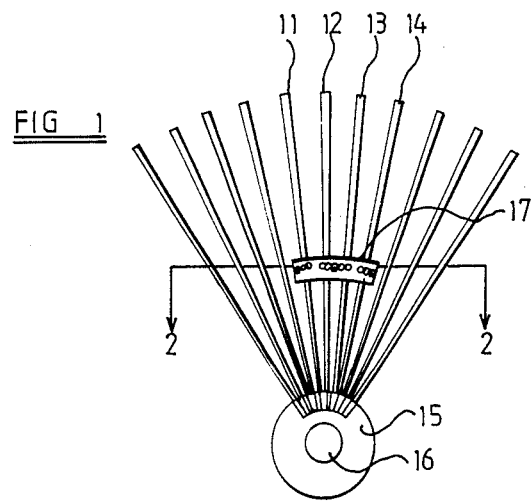
FIG 1
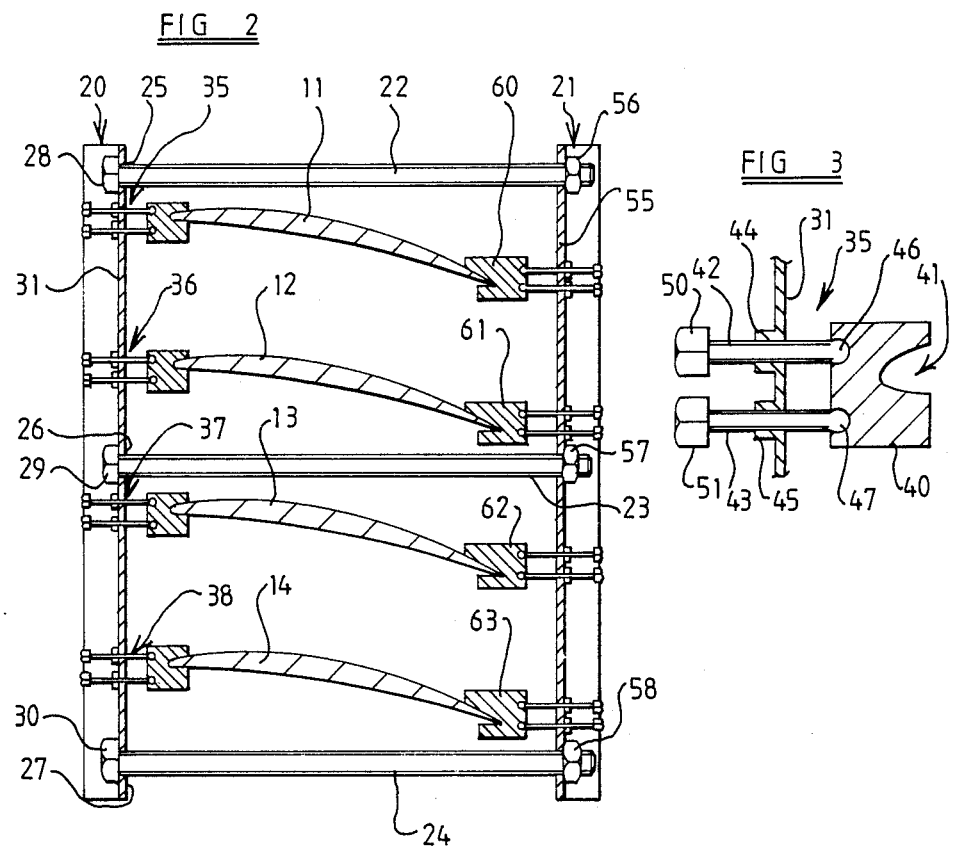
FIG 2
FIG 3

TURBINE BLADE REPAIR

BACKGROUND OF THE INVENTION

1. Field of the Invention

The present invention relates to a method of and apparatus for repairing high velocity fluid flow machinery such as turbines and in particular turbine blades.

Turbine blades are subjected to wear during use and, particularly in the case of steam turbines, it is the leading edge of the outer ends of the turbine blades in a rotor assembly that is most prone to erosion.

Erosion generally occurs because of contact between the blades and particles carried by the steam and also to a certain extent with the steam itself.

In view of the erosion that occurs, particularly at the leading outer edge of a turbine blade, it is usual to make that part of the blade as an insert made from suitable hardened steel or from another hard material, such as Stellite, or to provide the blade with a covering of such material, such piece or covering being secured to the blade by welding or brazing for example.

Inevitably, after a period of use, the turbine blades have to be replaced or repaired due to erosion that has occurred and possible other damage such as cracks or foreign object damage. In view of the high cost of replacing blades, it is desirable that a satisfactory and long lasting repair can be carried out and that such repairs can be carried out as quickly as possible so as to minimise down time of the turbine.

In the case of repairs such as, for example, the replacement of a hard metal shield or insert, considerable thermal energy is imparted to the blade during a welding or brazing operation which in some instances can cause considerable distortion to the blade.

2. Prior Art

It has been proposed in British patent specification 2,124,126 to counter said distortion by deliberately heating the blade in a manner to cause distortion in a direction opposite to the distortion that is expected to occur during such a welding or brazing operation.

It is sometimes desirable to carry out repairs on turbine blades in situ, that is when the blades are still attached to a "wheel" on a turbine shaft, and in such cases it is desirable to pre-distort the blade prior to the operation of repair requiring the input of considerable thermal energy. However, since the blade is still attached to the wheel, considerable problems arise in controlling the distortion input to the correct part of the blade.

SUMMARY OF THE INVENTION

It is an object of the present invention to provide a new or improved method of repairing turbine blades.

According to a first aspect of the invention, we provide a new or improved method of repairing a turbine blade, said method including a repair step requiring the input of considerable thermal energy to the blade, said method further comprising the steps of:
 (a) applying a physical force to a turbine blade to cause deformation in a direction opposite to the distortion expected to occur following the repair step incorporating the input of considerable thermal energy to the blade;
 (b) carrying out said repair step requiring the input of considerable thermal energy;
 (c) removing any physical force applied to the blade;
 (d) carrying out a stress relieving heat treatment.

The method may comprise the steps of applying a deforming force to the blade and by the application of restraining means maintaining the blade in a deformed condition while the repair step incorporating the application of considerable thermal energy is carried out to the blade, and subsequent to the repair step releasing the deforming force.

It is envisaged that where restraint means are provided, the deformation applied to the blade will be considerably greater than the distortion expected to occur during the application of the considerable thermal energy, since some of the applied deformation will comprise resilient deformation and after release of the deforming force, the blade will return to its desired position.

It is further envisaged that as a further alternative, the blade may be pre-deformed prior to the application of considerable thermal energy in a manner such that restraint is not necessary to maintain the blade in its deformed condition during the repair step involving the input of considerable thermal energy.

According to a second aspect of the invention, we provide a new or improved method of repairing a turbine blade, the method including a repair step requiring the input of considerable thermal energy to the blade, the method further comprising the steps of:
 (a) clamping a blade to be repaired relative to another part of the turbine at a position on the blade between a repair area and the position of securement of the blade to a shaft to which the blade is secured;
 (b) causing distortion of the blade in the region of said repair area in a direction opposite to the distortion as is expected to occur following a repair step incorporating the input of considerable thermal energy to the blade;
 (c) carrying out the repair step requiring the input of considerable thermal energy;
 (d) unclamping the blade.

Preferably, the blade to be repaired is clamped relative to at least one other adjacent blade.

Alternatively, the blade to be repaired may be clamped relative to the shaft of the turbine or some other suitable part whereby the clamped part of the blade may be securely fixed relative to the remainder of the turbine.

The clamping may comprise any suitable means and may comprise snubbers or other blade interconnection.

In the case where such blades have interconnection such as snubbers positioned radially inwardly of the area of the blade requiring repair and further interconnecting means such as snubbers positioned radially outwardly of the area of the blade requiring repair, the method of repair may comprise the steps of connecting the blade interconnecting means in the vicinity of the repair area or radially outwardly thereof and maintaining the interconnection between the blades radially inwardly of said repair area and distorting the blade to be repaired in a direction opposite to the distortion expected to occur when the repair step involving the input of considerable thermal energy is carried out so that the blade, after the repair step has been carried out, is in a position as near as possible to its correct aligned in-use position.

The means interconnecting the blade may comprise a part of the blade itself which may be a part of the blade which in effect divides a single blade into two separate aerofoils or a radially inwardly aerofoil and a radially outwardly aerofoil or it may, for example, comprise a snubber.

Parts connecting adjacent blades and which may be situated in the repair area or radially outwardly of the repair area may comprise further snubbers, lacing wires or shrouds.

Removal of such shrouds, lacing wires and radially outwardly positioned snubbers enables a single blade to be counter distorted without adversely affecting adjacent blades and by leaving the radially inner connection, such as an inner snubber, the radially inner part of the blade is effectively clamped in position so that during the counter distortion step the radially inner part of the blade is not adversely affected, since it is in effect firmly clamped by connection to the adjacent blades in the array.

It is further envisaged that the blade clamping means provided on the first and second parts may be adapted to receive a hardening filler material so that the part that makes contact with the leading edge or the trailing edge of the blade may be moulded to the exact contour of the blade by the inclusion of a filler when in a soft state, the filler hardening to the shape of that part of the blade with which it is in contact.

Where the blades are not provided with means whereby one blade may be clamped relative to another, clamping means may be provided.

It is a further object of the present invention to provide apparatus to assist in the method of repair above described.

According to a second aspect of the present invention, we provide apparatus for the use in the repair of turbine blades, the apparatus comprising clamping means having a part or parts adapted to engage with the leading edge of a plurality of turbine blades and a second part or parts adapted to engage with the trailing edges of the turbine blades and means engaging the first and second parts and means being operative to cause the first and second parts to engage with and clamp said leading edges and the trailing edges respectively so as to clamp the plurality of blades relative to each other to prevent relative movement between the blades being clamped at the position of said clamping means.

Preferably, said first part and/or said second part includes a plurality of blade clamping parts adjustably movable relative to the first part or said second part respectively and having means whereby it may be secured relative to the first part or said second part respectively.

Preferably, said blade clamping part is provided with a profile adapted to conform with the profile of the leading or trailing edge of a blade to which it is to be secured.

Preferably the means for clamping said first part and the second part includes one or more bolts or other threaded members which engage said first and second parts and extend between gaps existing between adjacent blades in the array.

As an alternative said apparatus for clamping the blade to be repaired may comprise a first part adapted to engage with a rotor shaft of the turbine, or other part associated with the shaft, and a second part adapted to engage with the turbine blade so as to clamp the blade relative to the shaft to prevent relative movement between the clamped part of the turbine blade and the shaft.

In the case where the clamping means clamps a blade to be repaired relative to the shaft, the clamping means may comprise two first parts, each adapted to co-operate with the shaft of the turbine, and the construction being that the first parts are axially spaced from each other and positioned on opposite sides of the turbine blade array having the blade to be repaired and wherein the clamping means is secured to the first part and is adapted to co-operate with the leading and trailing edges of the turbine blade to be repaired.

Preferably, the first part includes elongate members enabling the position of the clamping means to be adjusted in a direction radial to the axis of the turbine shaft.

Conveniently, the clamping means is provided with further adjustment means to enable the clamping means to be adjustable in a direction parallel to the axis of the turbine shaft.

In the case where blades are not provided with formations which enable clamping of a blade relative to another, the provision of clamping means as aforedescribed enables the blade to be clamped in a position spaced from the repair area so that when a force is applied to the blade to provide distortion effective to counter the distortion that is expected to occur during the repair of the blade, then the clamping means prevents the distortion force adversely affecting parts of the blade that should not be affected by the repair step and hence the predistortion applied to the blade can be accurately positioned.

In the case where one or more clamping means is used on a blade or blades being repaired, further clamping means as aforedescribed could be used in the vicinity of the repair area to deliberately hold the blades in a distorted position or a position at least different from the in-use position prior to or during the repair step involving the input of considerable thermal energy to the blade.

In the case where several blades in an array of blades are to be repaired, whereas the expected amount of distortion may already be known from previous experience, the actual distortion that occurs may be different from that expected and the first blade in an array of blades to be repaired may be used as an experimental blade to determine exactly what degree of distortion is likely to occur during the repair step, once that distortion has been carefully measured the amount of predistortion may be applied to each subsequent blade to counteract the expected distortion during the repair step.

The method of repair may include the steps of analysing the distortion that occurs on the first blade to be repaired and using the measured distortion to calculate the predistortion to be applied to each subsequent blade to be repaired.

The force necessary to provide the predistortion to the blade to counteract the distortion that is expected to occur during repair may be considerable and since the repair is to be carried out on the blades while they are in situ on the rotor, there can considerable problems in accurately providing the predistortion necessary.

According to a further aspect of the present invention, we provide apparatus to enable the distortion of a turbine blade, the apparatus comprising blade engagement means adapted to surround or otherwise engage a turbine blade at a predetermined position along the length of the blade, operating means comprising a manually operable part connected to one or more elongate members adapted to engage with said blade engagement means, the or each elongate member being of a length such that connection with the blade engagement means may be made by the elongate member or members while the manually operable part is radially outwardly of the outer end of the turbine blade.

Preferably, a plurality of elongate members are provided each elongate member being adapted to engage and co-operate with the blade engagement means.

Preferably the manually operable part comprises a further elongate member arranged substantially at right angles to the or each of the elongate members.

Preferably the blade engagement means may comprise a pair of members adapted to be secured to each other with a turbine blade "sandwiched" or otherwise positioned therebetween, the arrangement being such that the pair of members may be secured to each other around the turbine blade to firmly engage the turbine blade at a predetermined desired position.

Preferably the profile provided on at least one side of each of the pair of members is such that it follows closely the profile of the turbine blade at the position where the predistorting force is to be applied.

The apparatus as mentioned above overcomes the considerable difficulty of being able to accurately predistort a blade by physical force which has not hitherto been possible with some arrays of turbine blades in view of their very close proximity to adjacent blades which has left insufficient room to firmly grasp and distort the blade in the desired position.

BRIEF DESCRIPTION OF THE DRAWINGS

The invention will now be described in more detail by way of example only with reference to the accompanying drawings wherein:

FIG. 1 is a schematic view of part of an array of turbine blades in a rotor;

FIG. 2 is a sectional view along the line 2—2 in FIG. 1;

FIG. 3 is a sectional view of one of the blade clamping means;

DESCRIPTION OF THE PREFERRED EMBODIMENTS

Figure 4:
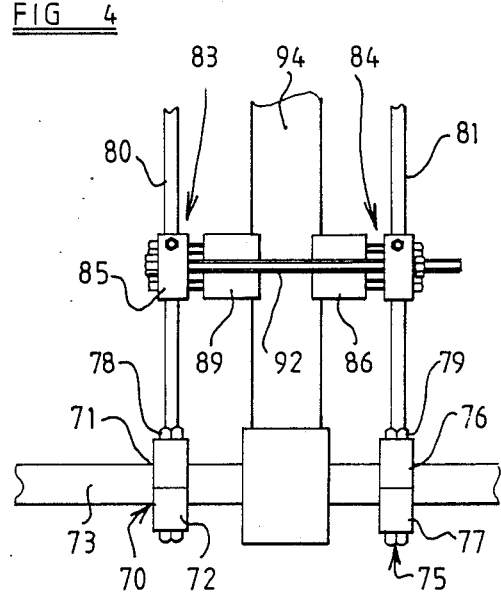
FIG. 4 is a diagrammatic view of an alternative arrangement of clamping means.

Referring first to FIG. 1, part of a turbine blade array on a rotor is shown the array including blades, some of which are shown at 11 to 14, the blades each having a root part secured to a wheel 15 of a turbine blade rotor shaft 16.

The complete array will include blades similar to those shown at 11 to 14 extending completely around the wheel 15 and in practice the blades will be tied together by lacing wires, snubbers or the like, in many cases a shroud may extend around the array secured for example by tennons extending from the outer ends of each turbine blade.

The array is shown in the drawings with any such shroud or lacing wire removed. However, in practice it may not be necessary to remove such shroud or lacing wires completely but to remove them only from the blades being repaired.

The clamping means is shown generally at 17 and is shown in more detail in FIG. 2. The clamping means comprises a first part 20, a second part 21 and means in the form of bolts 22, 23 and 24 connecting the first part 20 and second part 21.

The first part 20 is shown as a piece of angle iron, one flange of which is provided with apertures 25, 26 and 27 through which the bolts 22 to 24 respectively may pass, the head of each bolt 28, 29 and 30 engaging the flange 31 of the piece of angle iron.

The flange 31 also has secured thereto four blade clamping members 35, 36, 37 and 38, one of which, 35, will be described in more detail with reference to FIG. 3.

The blade clamping part 35 comprises a blade engaging member 40 having a cut-out indicated at 41 adapted to co-operate with the profile of the blade 11, the blade clamping part 40 being connected to the first part 20 via threaded members 42 and 43. The threaded members 42 and 43 are threadedly engaged with a nut part 44 and 45 respectively secured to the flange 31 of the first part 20 by welding for example, the threaded members 42 and 43 being connected to the clamping part 40 via a ball and socket type connection 46 and 47 respectively.

The blade clamping part 40 is thus adjustably connected to the first part 20 so that its position relative to the first part 20 may be adjusted, both in spacing and in angular alignment by rotation of the threaded members 42 and 43 which may be rotated by engagement of a spanner for example on the heads 50 and 51.

The other blade clamping means 36, 37 and 38 are the same as the blade clamping means 35 since they will be required to engage identical blades.

The second part 21 of the clamping means includes a piece of angle iron, similar to the first part 20 and is provided with a flange 55 against which nuts 56, 57 and 58 abut so that rotation of the threaded members 22, 23 or 24, or the nuts 56, 57 and 58 can cause the first and second parts to be moved towards or away from each other so as to cause clamping of the blades 11 to 14 or release thereof as desired.

Fine adjustment of the clamping of the blades 11 to 14 may be provided by adjustment of the blade clamping means 35 to 38 provided on the first part 20 or adjustment of the similar blade clamping means 60, 61, 62 or 63 provided on the second part 21. The mounting of the blade clamping means 60 to 63 on the second part 21 is the same as shown for the blade clamping means 35 shown in FIG. 3.

The adjustment means whereby the position of the blade clamping part 60 to 63 may be adjusted relative to the second part 21 enables careful alignment and firm clamping of the blade which, if desired, may be purposely misaligned from an in-use position or may be used to cause a misaligned blade to be forced into an aligned position.

In use of the apparatus if, for example, an erosion shield has to be removed and a new one replaced at the outer ends of one of the leading edges of the blades after removal of a shroud and any lacing wire from the vicinity of the repair step, the clamping means may be placed in position and the blade to be repaired firmly clamped relative to at least one other adjacent blade and preferably several other adjacent blades, and any damaged material and erosion shield may be removed from the blade by any suitable means, such as a combination of sawing and grinding.

From previous repairs, the distortion that is likely to occur when a new erosion shield is welded to the blade may well be known and the blade can be pre-distorted, i.e. bent, twisted or a combination of both, to a position which it is expected will precisely counteract the distortion that will occur during the welding operation.

Figure 6:
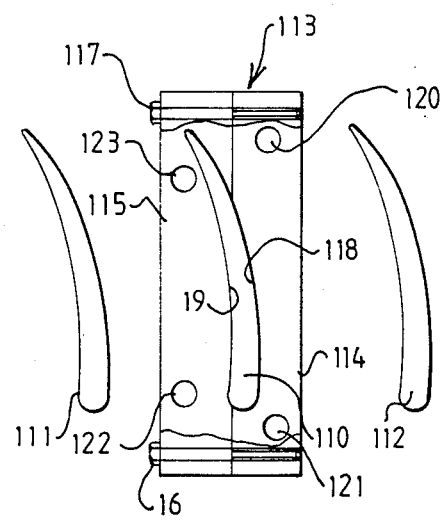
FIG. 6 is a diagrammatic plan view of three turbine blades one of which has secured thereto blade engagement means.

The predistortion or twisting of the turbine blade may be carried out by a twisting tool, for example as shown in FIGS. 6, 7, 8 and 9. The tool may comprise the form of blade engagement bars 114 and 115 as shown in FIG. 6 adapted to be in position around a turbine blade 110 and engaged by an operating member having a base part 125, on one side of which a manually operable part or handle 126 extends and from the other side a similar handle 127.

Figure 9:
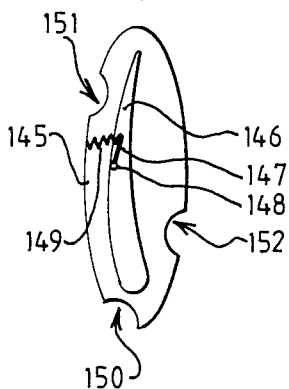
FIG. 9 is a plan view of an alternative engagement means.

Alternatively, the blade engagement member 145 may be provided as shown in FIG. 9.

The blade twisting tool will now be described in more detail.

Referring to FIG. 6, an array of three turbine blades 110, 111 and 112 is shown. A turbine blade 110 has secured thereto a part of a blade twisting tool comprising blade engagement means generally located at 113.

The engagement means 113 comprise two bar-like members 114 and 115 which are secured together by machine screws 116 and 117. The bar-like member 114 has a profile edge 118 thereto that conforms closely to the profile of the turbine blade 110 and the engagement bar 115 has a profile edge 119 that conforms closely to the opposite side of the turbine blade 110.

Since the profile of a turbine blade changes along its length it will be appreciated that to engage a turbine blade as closely as shown in the embodiment in FIG. 6 many engagement bars may be needed having different profiles and it is envisaged that in certain circumstances the engagement may not be as accurate as that shown and if desired additional spacer members may be used. Such spacer members being placed between the engagement members 114 and 115 and the turbine blade 110.

The engagement bar 114 is provided with two apertures 120 and 121 and the engagement bar 115 is provided with similar apertures 122 and 123.

Figure 7:
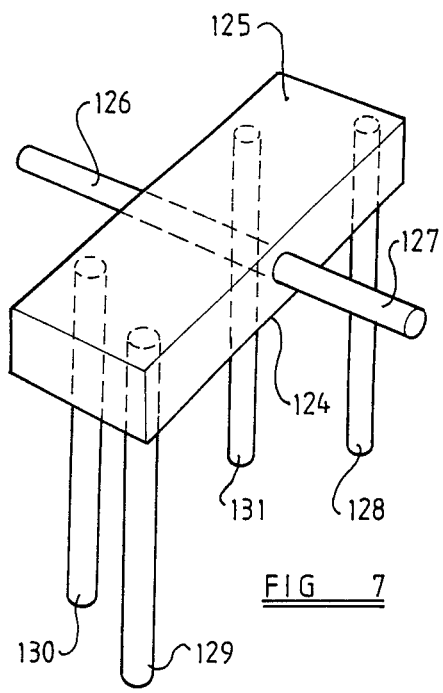
FIG. 7 is a perspective view of one embodiment of an operating member.

Referring now in addition to FIG. 7, the operating member comprises a base part 125 from one side of which a manually operable part or handle 126 extends and from the other side a similar handle 127.

The underside 124 of the base member 125 has extending therefrom four rod like elongate members 128, 129, 130 and 131.

Figure 8:
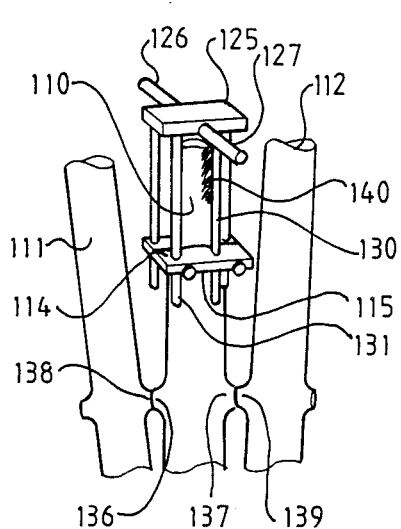
FIG. 8 is an illustration of the operating member cooperating with the blade engagement means while the blade engagement means are affixed to a turbine blade.

The rod like elongate members 128 to 131 are of a size such that they will engage within apertures 120 to 123 respectively so that the operating member may be engaged with the engagement member in a manner as shown in FIG. 8.

FIG. 8 shows three turbine blades 110, 111 and 112 secured to a rotor. The turbine blades are provided with snubbers each snubber on turbine blade 110 being indicated at 136 and 137 which effectively tie or clamp the blades of a turbine blade array together e.g. the snubber 136 is connected to the snubber 138 provided on turbine blade 111 and the snubber 137 is connected to snubber 139 on turbine blade 112.

It is normally the outer leading edge of a turbine blade that is most prone to wear and which is most often the part that requires repair such area being indicated at 140.

In order to effect repair in the area 40 welding or brazing is necessary which can cause considerable distortion to the blade over a substantial part of its length.

Distortion is not however likely to be caused to the part of the blade where the snubbers 136 and 137 are provided and in most cases it is quite possible to leave the connection between the snubbers of adjacent blades intact.

It can be found from the repair of a blade without any predistortion having been carried out or it may be known from a previously repaired blade almost exactly what distortion is likely to occur during the repair of the blade. In order to counteract such distortion, the engagement means as indicated at 113 is positioned at the desired positions along the blade the operating member is secured thereto as shown in FIG. 8 and the blade twisted by an operator holding the handles 126 and 127 and applying a turning torque so as to cause twist of the blade.

In practice it may be necessary to move the engagement means or if close conformity to the profile of the blade is necessary to provide different engagement means all of which are in turn engaged by the operating member and a predetermined amount of twist is applied to the blade. The engagement means may then be removed and the repair step involving the input of considerable thermal energy to the blade may be carried out. Stress relief may subsequently be carried out so that the blade is returned to a correct position and is left substantially free from stress.

Referring now to FIG. 9, an alternative engagement means is shown which comprises a single part 145 having an aperture 146 therein that conforms approximately to the profile of the blade but allows the engagement part 145 to be positioned at any one of a number of predetermined desired positions along the length of the blade.

Undesired movement of the engagement part 145 along the blade is prevented by a resiliently biased tongue 147 which is pivotally connected to the engagement part 145 by pivotal connection 148 and is biased by a spring 149 so that the tongue 147 is pressed against the blade to prevent undesired movement of the engagement part 145.

The engagement part 145 shown in FIG. 9 is designed so as to be adaptable to a turbine blade array where there is only a very small amount of room between adjacent blades. The engagement part 145 is provided with three cut-outs 150, 151 and 152 which will be engaged by the elongate members provided on an operating member in this case having only three elongate members.

The use of a clamping means of the engagement means shown in FIG. 9 to twist the blade is the same as aforedescribed however as abovementioned the engagement means is adaptable to different positions along the blade so that predetermined amounts of twist may be applied to the blade using a single engagement means.

If desired spacer members may be inserted between the engagement means on the blade so as to provide a better fit.

It is envisaged, in particular where the engagement means is a single member, that the slot formed therein to engage the blade profile may only be capable of engaging a particular section after a certain amount of twisting has taken place to the upper part of the blade, which twist allows the engagement means to be moved along the blade to the required section, thus ensuring that any twist carried out to the blade is conducted evenly and twist to a lower part of the blade may not be carried out until the upper part has been pre-distorted by the required amount.

It is further envisaged that some engagement means may have a greater dimension in a direction parallel to the longitudinal axis of the blade, which engagement means may be used in position where there is a potential weakness, such as a lacing wire hole or the like, so that the torque applied to the blade is spread more evenly over a greater area.

Whereas the tool of the present invention is primarily for use where a repair is to be carried out on a blade, which repair requires the application of considerable thermal energy such that the blade may well be distorted by such repair, it is also envisaged that the tool will be of assistance in resetting blades that might themselves not have required repair but through use, or other reason, had become distorted from their correct shape. After the tool has been used to correct the shape of such blades to it is expected that a full heat treatment process would be carried out to relieve any stress in the blade.

After a new piece of material has been welded to the blade, the position of the blade can be checked, for example by using the alignment means the subject of co-pending application by the applicants, and if the blade is found to be in an incorrect position it may be further worked to return it to its proper position prior to any stress relieving heat treatment carried out on the blade.

Figure 5:
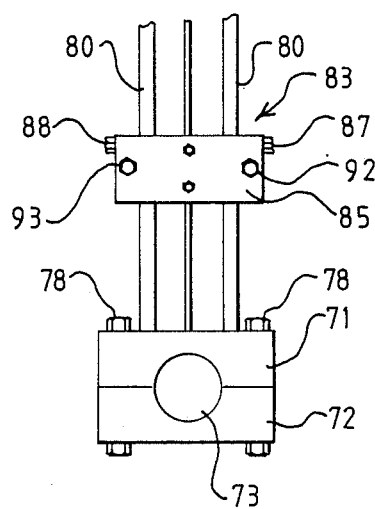
FIG. 5 is another view of the clamping means shown in FIG. 4.

Referring now to FIGS. 4 and 5, an alternative arrangement of clamping means is shown in which a first part generally indicated at 70 comprises two collar-like members 71 and 72 which are firmly clamped to the turbine shaft 73. A similar first part is indicated at 75 and comprises collar-like members 76 and 77, both first parts being clamped to the shaft 73 by pairs of bolts 78 and 79 respectively.

Extending from the collar 71 and the collar 76 are pairs of elongate members 80 and 81 which carry respective clamping means generally indicated at 83 and 84.

The clamping means 83 comprises a movable part 85 having through bores to enable it to be slidably engageable on the elongate members 80, its position relative to the elongate members 80 being lockable by locking bolts 87 and 88, the movable member 85 carrying a clamping part 89 which may be identical to the clamping members shown in FIG. 3, the clamping part 89 being adapted to engage with the leading edge of a blade 94.

The elongate members 81 carry a clamping means 84 which is similar to the clamping means 83, however in this case the profile of the cut-out on the clamping part 86 will be adapted to co-operate with the trailing edge of the blade 94.

A pair of bolts 92 and 93 extend between clamping means 83 and 84 so that the blade 94 may be firmly clamped in position so as to permit of distortion of a radially outer part of the blade without adversely affecting the radially inwardly part of the blade.

It is envisaged that in some cases a single first part may be sufficient in which case the second first part 75 and its associated elongate members 81 would not be necessary. However, in such an embodiment the clamping means may be different so as to ensure firm clamping of the blade relative to the shaft 73.

The position of the clamping means prevents the lower part of the blade being subjected to distortion during the action of pre-distortion when using the tool as shown in FIGS. 6 to 9 for example, or for that matter during the repair itself. Because it is firmly clamped relative to adjacent blades or the shaft, enables that part of the blade which is likely to be subjected to distortion during welding to be accurately deformed to a shape that will counteract the distortion that occurs during welding, so that after welding the blade is back in its proper in-use position.

If the expected distortion is not known, a blade may be repaired without any pre-distortion taking place, the distortion being measured after the repair step has been completed such that each subsequent blade to be repaired in a similar manner may be pre-distorted to the measured so that after repair each blade is in a proper aligned position enabling stress relieving heat treatment to be carried out.

It is envisaged that the cut-outs, for example the cut-out 41, on the blade clamping part 40 may be provided with a cementitious like material which is in a soft state when the blades are clamped and which rapidly hardens in response to the application of heat so that there can be no "play" between the blade clamping parts and the blade being clamped to ensure that each blade held by the clamping means is held firmly in a desired clamped position.

Figure 10:
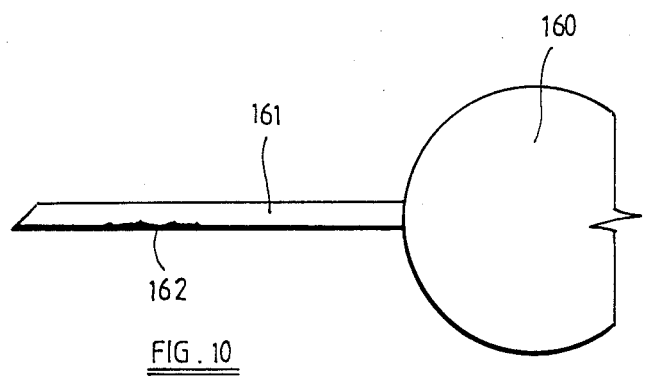
FIG. 10 is a diagrammatic view of a turbine blade on a rotor.
Figure 11:
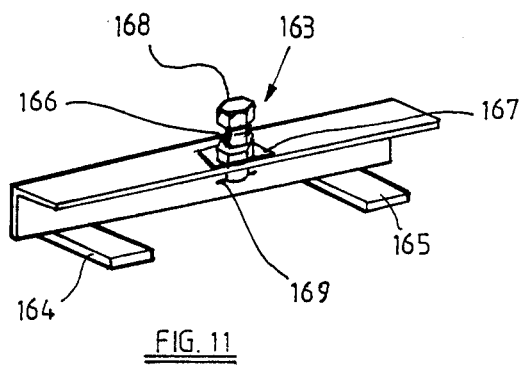
FIG. 11 illustrates a turbine blade distorting means.
Figure 12:
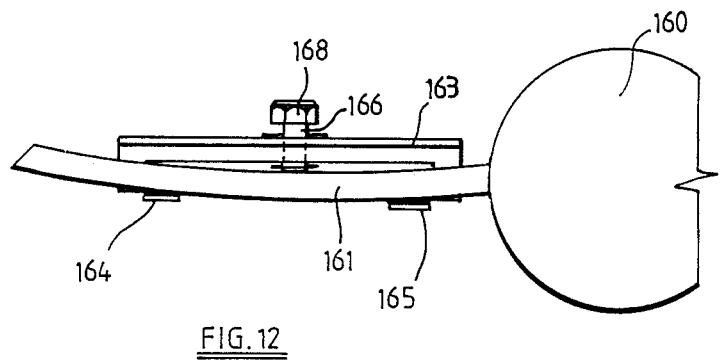
FIG. 12 illustrates the distorting means in a blade distorting position.

Referring now to FIGS. 10, 11 and 12, a turbine blade rotor is shown schematically at 160 and a single blade at 161. A damaged area is shown at 162 which requires repair involving the input of considerable thermal energy.

In order to predistort the blade prior to the repair step involving the input of considerable thermal energy, e.g. a welding operation, a blade distorting means as shown in FIG. 11 is applied to the blade 161, the blade distorting means comprises an elongate member 163 having secured thereto, by welding for example, a first bracket 164 and a second bracket 165 which may alternatively be secured to the elongate member 163 by some other means, for example bolts, whereby they may be secured at different positions along the elongate member 163.

A threaded member 166 is threadedly engaged with a nut member 167 which is secured to the elongate member 163. The threaded member 166 has a head 168 and a thrust plate 169.

Referring now in addition to FIG. 12, the blade distorting means is shown in position applying a predistorting force to the blade 161.

In practice, where such a distorting means is used the distortion applied will be greater than that expected to occur during welding of the blade and of course in an opposite direction. The reason the increase in distortion over that expected to occur is that a considerable amount of the distortion will be resilient distortion and will be removed once the blade distorting means is removed from the blade. Thus, after carrying out the welding operation and removal of the blade distorting means, the blade should then return to its correct position.

As an alternative to the distorting means 163 shown in FIGS. 11 and 12, it is envisaged that the rotor 160, or at least the blades attached thereto, may be positioned relative to a work surface and an individual blade may be secured at different positions relative to that work surface to provide a physical distorting force to the blade during welding of the blade.

The alternative method as aforedescribed differs only from the other methods described in that the physical force distorting the blade is maintained during the repair step involving the application of considerable thermal energy and is released only thereafter and, as aforementioned, since some of the distortion will be resilient distortion, the force applied and the total distortion of the blade applied by the means will be greater than the distortion in an opposite direction caused by the application of considerable thermal energy.

It will be appreciated that the clamping means and blade predistortion tool above described are merely examples and the clamping means of the present invention may take different forms and the method of repair may include any additional steps such as pre-heating, heating during the repair step, filling of lacing wires or other discontinuities and one or several alignment checks during or between the various repair steps to ensure that prior to stress relieving heat treatment, the blade is in its desired in-use position.

We claim:

1. A method of repairing a turbine blade, said method including a repair step requiring the input of considerable thermal energy to the blade, said method further comprising the steps of:
   (a) applying a physical force to a turbine blade to cause distortion in a direction opposite to the distortion expected to occur following the repair step incorporating the input of considerable thermal energy to the blade;
   (b) carrying out said repair step requiring the input of considerable thermal energy;
   (c) removing any physical force applied to the blade;
   (d) carrying out a stress relieving heat treatment to said blade.

2. A method of repairing a turbine blade according to claim 1 further comprising the steps of:
   (a) maintaining said physical force during said repair step requiring the input of considerable thermal energy to the blade;
   (b) applying sufficient physical force to cause the blade to be distorted in a direction opposite to that expected by the application of considerable thermal energy by an amount in excess of the amount of distortion expected by the application of considerable thermal energy.

3. A method of repairing a turbine blade according to claim 1, said method including a repair step requiring the input of considerable thermal energy to the blade, said method further comprising the steps of:
   (a) clamping a blade to be repaired relative to another part of the turbine at a position on the blade between a repair area and the position of securement of the blade to a shaft to which said blade is secured;
   (b) causing distortion of the blade in the region of said repair area in a direction opposite to the distortion as is expected to occur following a repair step incorporating the input of considerable thermal energy to the blade;
   (c) carrying out said repair step requiring the input of considerable thermal energy;
   (d) unclamping said blade.

4. A method according to claim 3 wherein the blade to be repaired is clamped relative to at least one other adjacent blade.

5. A method according to claim 3 wherein the blade to be repaired is clamped relative to the shaft of the turbine or some other suitable part enabling the clamped part of a blade to be securely fixed relative to the remainder of the rotor.

6. A method according to claim 3 wherein said clamping means comprise blade interconnecting means provided on said turbine blades.

7. A method of repair according to claim 3 wherein said clamping means comprises detachable clamping means securable to said turbine blades prior to the repair and removable thereafter.

* * * * *